United States Patent [19]

Jayapalan et al.

[11] Patent Number: 4,755,985
[45] Date of Patent: Jul. 5, 1988

[54] METHOD AND APPARATUS FOR FACILITATING MOVES AND CHANGES IN A COMMUNICATION SYSTEM

[75] Inventors: Jay P. Jayapalan, Hollywood; Robert S. Town, Plantation; Harendra H. Vora, Coconut Creek, all of Fla.

[73] Assignee: Racal Data Communications Inc., Sunrise, Fla.

[21] Appl. No.: 939,841

[22] Filed: Dec. 9, 1986

[51] Int. Cl.⁴ .................. H04M 11/04; H04Q 11/04
[52] U.S. Cl. ............................ 370/58; 370/60; 379/94; 379/245; 379/269
[58] Field of Search .......... 379/34, 269, 94, 245; 370/58, 60, 94, 110.1

[56] References Cited

U.S. PATENT DOCUMENTS

| | | | |
|---|---|---|---|
| 3,546,393 | 12/1970 | Joel, Jr. ................ | 379/207 |
| 3,553,373 | 1/1971 | Shaw ..................... | 379/204 |
| 3,673,341 | 6/1972 | Finkhauser ............. | 379/211 |
| 3,689,703 | 9/1972 | Allen et al. ............ | 379/244 |
| 4,277,649 | 7/1981 | Sheinbein .............. | 379/201 |
| 4,313,035 | 1/1982 | Jordan et al. .......... | 379/207 |
| 4,413,158 | 11/1983 | Danford ................. | 379/211 |
| 4,577,066 | 3/1986 | Bimonte et al. ........ | 379/221 |
| 4,608,460 | 8/1986 | Carter et al. ........... | 379/71 |
| 4,688,214 | 8/1987 | DeWitt et al. .......... | 370/94 |
| 4,698,841 | 10/1987 | Haselton et al. ....... | 379/269 |
| 4,700,340 | 10/1987 | Beranek et al. ........ | 370/16 |

OTHER PUBLICATIONS

"ISDN in the Office-HICOM", Special Issue of *telcom report* and *Siemens Magazine COM*, Dec. 1985.

Primary Examiner—Thomas W. Brown
Attorney, Agent, or Firm—Jerry A. Miller

[57] ABSTRACT

The present invention relates to a communication system which includes a plurality of N communication links coupled to a central office. A plurality of N−1 user devices are coupled to N−1 of the N communication links with each of the N−1 user devices including a memory for storing a translation table relating a device identification code for each of the N−1 user devices to a directory code associated with each of the communication links. An input is situated at each of the N−1 user devices, for allowing a user to supply a device identification code of another user device to be called. A translating circuit is situated at each of the N−1 user devices, for translating the device identification code to it's associated directory code responsive to the input of a device identification code by the user by reading the translation table. A call is initiated responsive to the translating circuit for and a manager station is coupled to the remaining one of the N communication links, for updating each of the memories responsive to changes in the relationship between device identification codes and directory codes due to changes in the configuration of the communication system. The manager device is used to maintain the translation table and may also be used to manage extended features of the communication system.

8 Claims, 6 Drawing Sheets

| DEVICE ID | DIRECTORY # |
|---|---|
| MGR | X |
| 1 | A |
| 2 | B |
| • | • |
| • | • |
| • | • |
| • | • |
| n | ZZ |

| HEX CODE | MESSAGE | DIRECTION | DESCRIPTION |
|---|---|---|---|
| 01 | TABLE UPDATE | BOTH | PROVIDES A FULL COPY OF TRANSLATION TABLE |
| 02 | TABLE MODIFY | BOTH | PROVIDES CHANGES IN THE TRANSLATION TABLE |
| 03 | MGR'S DIR. # | MGR → UD | MGR USES THE MESSAGE TO INFORM UD, THE NEW DN ASSOCIATED WITH MGR |
| 04 | USER ID | MGR → UD | MGR MAY USE THIS MESSAGE TO INFORM UD OF ITS NEW ID |
| 05 | TEST MESSAGE | BOTH | MAY BE USED WHEN TESTS ARE BEING PERFORMED BY MGR |
| 06 | CALL RECORD | BOTH | MGR MAY QUERY UD FOR DETAILED CALL RECORD USING THIS MESSAGE |
| 07 | CLASS OF SERVICE | MGR → UD | MGR PROVIDES CLASS OF SERVICE TO UD USING THIS MESSAGE |
| 08 | RESTRICTED TOLL ACCESS | MGR → UD | MGR PROVIDES A LIST OF AREA CODES IF USER IS RESTRICTED TO CERTAIN AREA CODES |

Fig. 6

METHOD AND APPARATUS FOR FACILITATING MOVES AND CHANGES IN A COMMUNICATION SYSTEM

BACKGROUND

1. Field of the Invention

This invention relates generally to the field of office communication systems including telephone and data communication systems such as Integrated Services Digital Network (ISDN). More particularly, this invention relates to communication system particularly well suited for business telephone systems which must frequently deal with moves and changes of offices and personnel.

2. Background

Traditionally, the administration of moves and changes of communication lines such as telephone lines, has been handled by the local telephone company with a service order. The customer generally pays a substantial fee for such services (for example Centrex service) from the telephone company. Industry has recognized that such charges can be very costly and large customers have substantially reduced such costs by installation of Private Area Branch Exchange (PABX) type equipment in order to take control of such changes themselves. This has been a very popular way to reduce telephone charges in recent years. Unfortunately, PABX equipment is quite expensive and frequently requires full time personnel to operate and maintain to assure continuous uninterrupted telephone service. Therefore, PABX equipment remains a solution primarily for larger bases of telephone line users.

This disclosure describes a method whereby centrex type service users may have capabilities to administer changes in their Customer Premise Environment (CPE) equipment configuration without the intervention of the serving telephone company or a Government entity providing such telephone service. The method allows customers to manage reassignment of communication lines to end users based on the changing requirements within the CPE, without the telephone company service order and without the use of centralized equipment for call processing such as PABX or keysystem. This is especially well suited to small to medium sized customers but may be used with larger customers also. The present invention offers Centrex users efficient and economical way of reassigning communication lines to end users.

SUMMARY OF THE INVENTION

It is an object of the present invention to provide a method and apparatus for administering moves and changes in telephone numbers in a telephone system.

It is another object of the present invention to provide a method and apparatus for providing simplified moves and changes in a communication system such as an ISDN which is administered by the customer without telephone company intervention.

It is a further object of the present invention to provide a communication system having simplified administration of moves and changes without need for centralized user premises based equipment.

These and other objects of the invention will become apparent to those skilled in the art upon consideration of the following description of the invention In one embodiment of the present invention, a communication system includes a plurality of N communication links coupled to a central office. A plurality of N−1 user devices are coupled to N−1 of the N communication links with each of the N−1 user devices including a memory for storing a translation table relating a device identification code for each of the N−1 user devices to a directory code associated with each of the communication links. An input is situated at each of the N−1 user devices, for allowing a user to supply a device identification code of another user device to be called. A translating circuit is situated at each of the N−1 user devices, for translating the device identification code to it's associated directory code responsive to the input of a device identification code by the user by reading the translation table. A call is initiated responsive to the translating circuit and a manager station is coupled to the remaining one of the N communication links, for updating each of the memories responsive to changes in the relationship between device identification codes and directory codes due to changes in the configuration of the communication system.

In another embodiment of the present invention, a method of providing for moves and changes in a communication system, includes the steps of:

providing a plurality of user devices for connection to a plurality of communication links, each of the communication links coupled to a central office;

connecting one of the user devices to one of the communication links;

transmitting a message from the user device to a manager device through a central office to notify the manager of a connection of the user device to the communication link; and transmitting a message from the manager to each of the user devices to update a translation table in the user devices, the translation table serving to provide a translation between a device code associated with each device to a directory code, associated with each of the communication links.

The invention pertains to telephone systems in general and particularly to business customers using several communication lines without the centralized Customer Premise Environment (CPE) Equipment such as PABX or key systems for call processing. More specifically the invention pertains to a method which will allow customers to manage their communication lines on a day to day basis more efficiently and more economically, to suit their specific needs arising from the moves and changes of services at the CPE. Numerous other features under direct control of subscribers are available with this approach.

Although the description that follows is based on the application of this approach in an Integrated Services Digital Network (ISDN), the same approach can be generally applied to any communication network which allows message transfer between CPE equipment devices via switched network paths.

The features of the invention believed to be novel are set forth with particularity in the appended claims. The invention itself, however, both as to organization and method of operation, together with further objects and advantages thereof, may be best understood by reference to the following description taken in conjunction with the following drawings.

DESCRIPTION OF THE DRAWINGS

FIG. 6 is a table of message identifiers.

DETAILED DESCRIPTION OF THE INVENTION

Figures 1, 4:
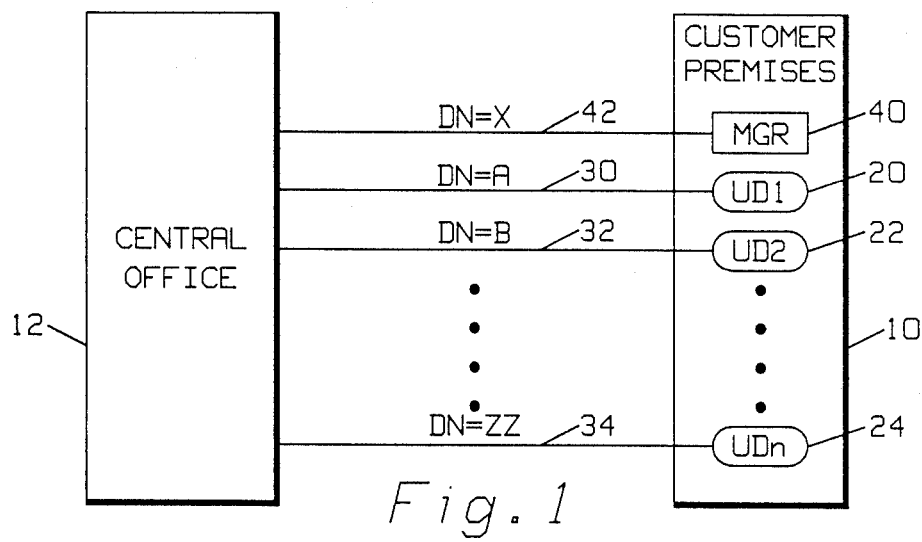
FIG. 1 shows the overall system configuration of the present invention.
FIG. 4 is an example of a translation table as used in the present invention.

Turning now to FIG. 1, a system configuration involving a multiline customer at a customer or user premises 10 and served by a central office 12 is shown. The CPE equipment includes several USER DEVICES (UD) 20, 22 through 24 associated with communication lines 30, 32 through 34 with specific directory numbers (DN). In the preferred embodiment the UDs are devices such as ISDN telephones, ISDN terminals, ISDN Terminal Adapters (TA), workstations etc. which have a capability to originate and receive calls and to transfer data messages and voice (for voice terminals) through the network. The CPE equipment also includes a unit designated as Manager (MGR) 40 which has all the capabilities of a User Device (UD), and in addition has administrative responsibility of managing equipment moves and changes. The Manager is connected to it's own communication line 42 to the central office 12. All communication between User Devices and User Devices or Manager take place through the central office 12.

Each User Device has a unique identity code (UID) which is assigned to each device either at the time of manufacture (e.g. a serial number) or entered at the customer location as a configuration parameter. This User identity is permanently or semi-permanetly stored in the User device. If entered as a site configuration parameter, it can be changed by customer manually using strapping in the UD or may be stored in non-volatile memory and entered via a control panel or keyboard on the UD. For better control of the UIDs at the customer location, the UID may be administered by the MGR via a message to the UD as explained later. In addition to UID, a directory number of the MGR is stored permanently or semi-permanently in each UD, for automatically generating a call to the MGR for reporting changes or for requesting service. This directory number will may be entered as site configuration parameter and can be modified via message from MGR or manually using a strapping option or manual entry from a control panel on UD. Each UD has access to a circuit or packet switched data call facility available through the network in addition to any voice requirement, to allow data communication for message transfer between MGR and the UD in the preferred embodiment.

The MGR is assigned at least one communication line. In more sophisticated systems, the MGR may make productive use of more than one line, as will be apparent to those skilled in the art. At locations requiring multiple communication lines to the MGR, a hunt group with a pilot directory number may be used for access from User Devices. For installations of a large number of UDs, a MGR with access to multiple communication lines not only provides faster service but also offers more reliability. When one of the communication lines assigned to the MGR is defective, access to the Manager from UDs is assured by the other communication lines assigned to the MGR.

Figure 2:
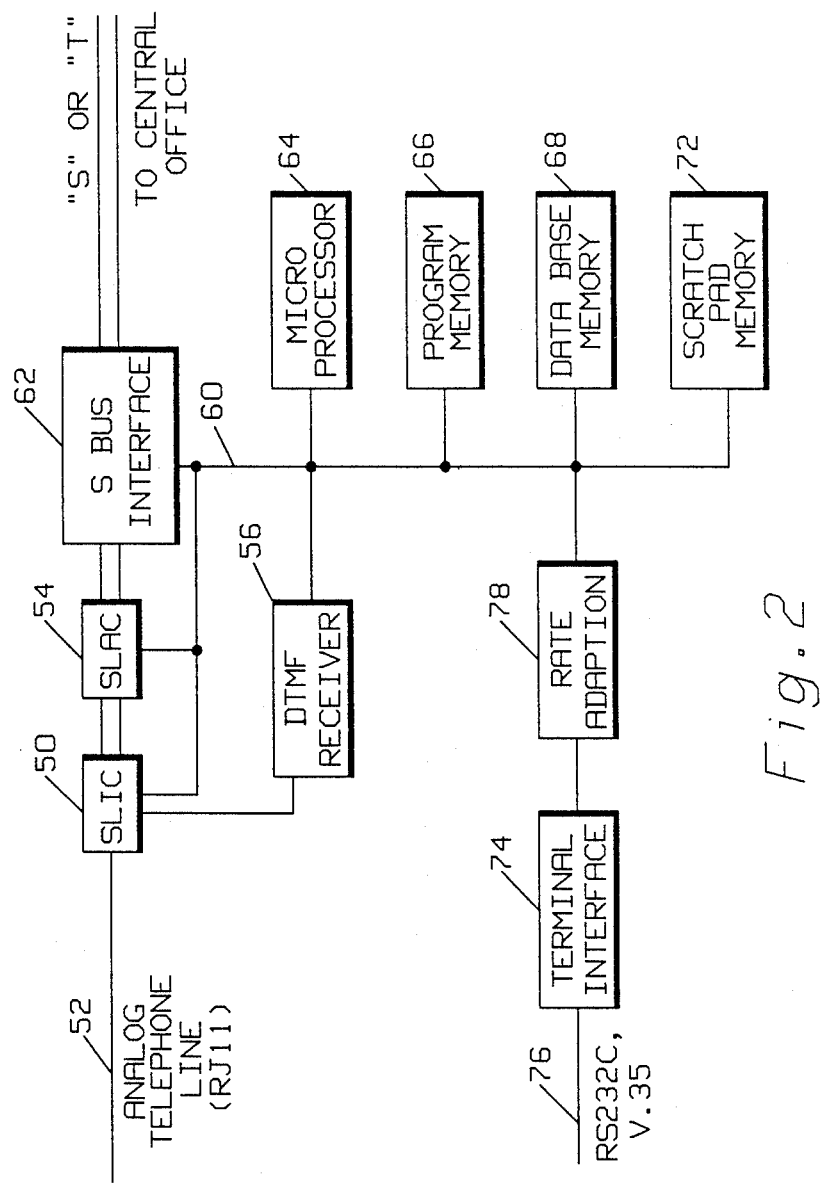
FIG. 2 shows a functional block diagram of the user device or manager of the present invention.

FIG. 2 shows a functional block diagram of the hardware implementation of a User Device in the form of an ISDN terminal adapter. Note that the same hardware implementation with a additional software for administrative functions will allow essentially the same or similar hardware configuration to be used as a Manager.

The telephony interface is shown as being comprised of a Subscriber Line Interface Circuit (SLIC) 50 which is coupled to an analog telephone line 52. The Subscriber Line Interface Circuit 50 also coupled to a Subscriber Line Audio Circuit (SLAC) 54, and a Dual Tone Multi-Frequency (DTMF) tone receiver and decoder circuitry 56. The Subscriber Line Interface Circuit (SLIC) provides a plurality of standard telephone line interface functions such as battery, overvoltage protection, ringing, supervision, 2 to 4 wire hybrid, and transmission. The Subscriber Line Audio Circuit (SLAC) essentially provides means to digitize voice samples using techniques such as Pulse Code Modulation with Mu-Law compression (for USA) or A-Law compression (for Europe). The SLIC and SLAC components are commercially available from Advanced Micro Devices ® as part numbers AMD 7950 and 7905 respectively. After processing by the SLAC, digitized voice samples are presented to a data bus 60 for transmission over an S-Bus Interface 62. The S-Bus interface circuitry provides standard interface to ISDN networks via the Physical Layer (Layer 1) interface as defined in CCITT Recommendation I.430. The ISDN S-Bus Interface may be implemented, for example, by Siemens ® part numbers ICC 2070 and SBC 2080 devices. The DTMF Tone Receiver and Decoder when enabled, monitors the analog tones sent over the telephone line, and decodes the tones into binary coded digits that can be sent to a processor such as microprocessor 64 for call processing. Mitel ® part number MT8870A may, for example, be used to form the basis of the DTMF receiver 56.

Microprocessor 64 is coupled to bus 60 in order to gain access to the other circuitry described above as well as a program memory 66, a data base memory 68 and a scratch pad memory 72. Program memory 66 is used to store the program instructions that control the UD or Manager. The actual code itself determines which device is actually implemented by the hardware of FIG. 2 in the preferred embodiment. The data base memory 68 is used to store the translation table relating directory numbers with device identification codes. The scratch pad memory 72 is used by the microprocessor 64 for temporary storage requirements.

A Terminal Interface 74 is coupled to the user's terminal device and includes driver and receiver circuitry for transmitting and receiving data respectively from a Data Terminal Equipment (DTE) using industry standard interface such as RS232C or V.35. A Rate Adaption circuit is coupled between terminal interface 74 and bus 60 to allow low speed data from terminal interface 74 to be sent at, for example, 64 Kbps rate over an ISDN Bearer channel (known as B-channel). A preferred specific scheme for rate adaption is described in details in the CCITT Recommendations I.460 through I.464.

The UD and MGR are controlled by microprocessor 64 and the program memory. The program memory 66 may be either in a masked Read Only Memory (ROM) or an Erasable Programmable Read Only Memory (EPROM) in the preferred embodiments. The data base memory 68 stores all site configuration parameters and directory number of the MGR. Unless the UID is stored elsewhere, the User Device will also have its UID stored in the data base memory. Other parameters such as Class of Service, feature access parameters, toll restriction parameters may also stored in the data base memory 68. The data base memory 68 is preferably implemented by either Electrically Erasable Programmable Read Only Memory (EEPROM) or a battery backed up Random Access Memory. The scratch-pad memory 72 is implemented by Random Access Memory (RAM) components, and provides a temporary work space for the processor.

Figure 3:
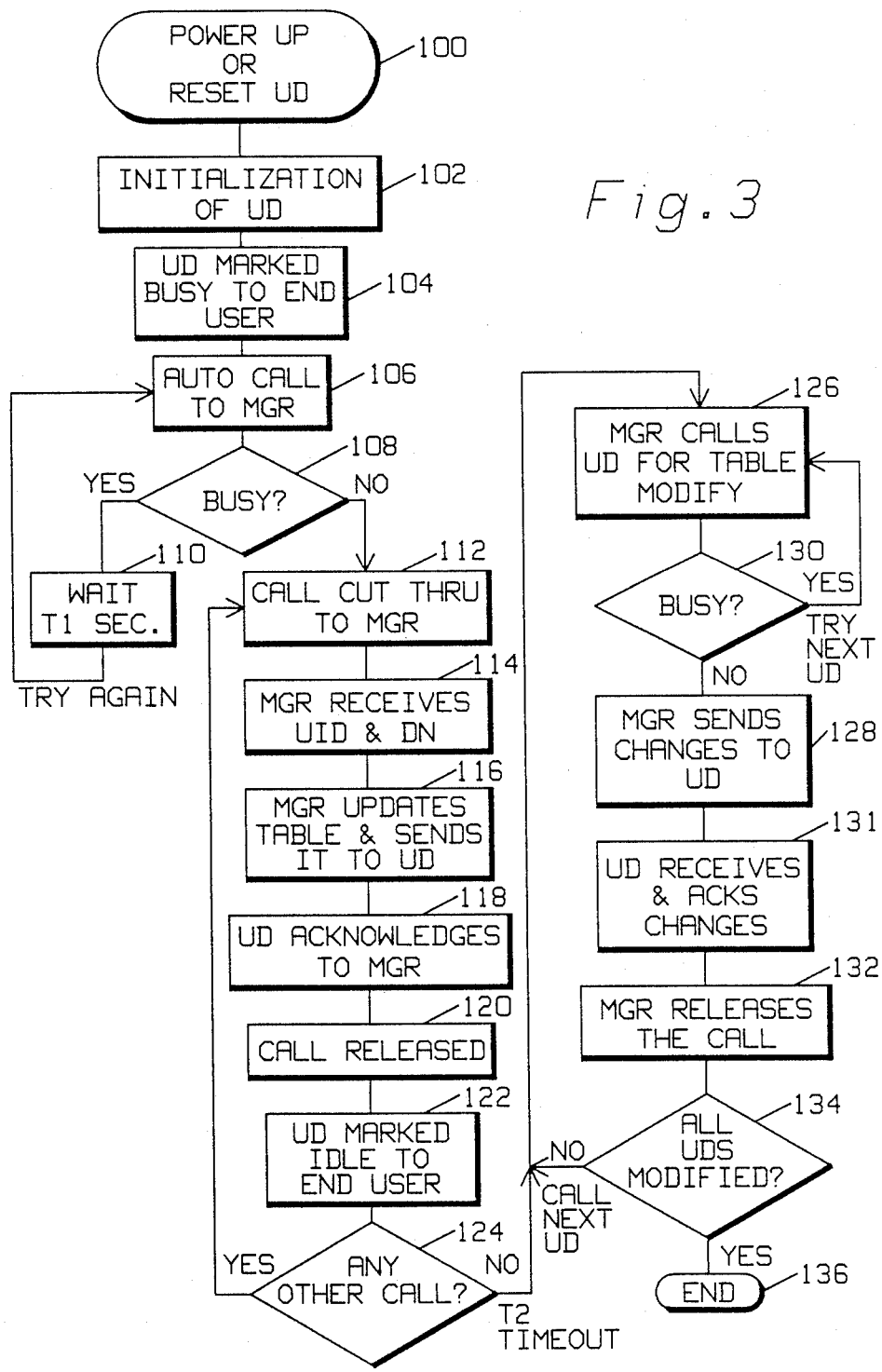
FIG. 3 is a flow chart describing the procedure for managing moves according to the present invention.

The method of using the MGR for managing moves and changes is illustrated in the Flow Diagram shown in FIG. 3. When the UD is powered up at 11 it goes through an initialization sequence. The initialization sequence may also result when automatic or manual RESET is is instituted. This initialization process is followed by an Auto call (call originated by UD automatically under program control) which includes marking the unit not available at 104 or busy to the end user and originating a call to the MGR at 106 using the Directory Number (DN) of the MGR stored in the UD. In ISDN this may be accomplished by a SETUP message, as described in CCITT Recommendation I.451. If the network busy condition is encountered or if the MGR is busy at 108, the UD is notified accordingly by the network. At this point, the UD may disconnect and wait for T1 seconds at 110 (T1 value may be programmed in UD for instance between 10 to 100 seconds), and retry the call by passing control back to step 106. If the line associated with the MGR is not busy at 108, the call is offered by ISDN to the MGR via a SETUP message.

It is the responsibility of the UD to send its UID to the MGR. In ISDN it can be done in at least two ways: (a) The UID may be sent as a part of the SETUP message in the User to User information field as specified in CCITT I.451 section 4.5.27 or (b) The UID may be sent in a message over the B-channel after the call is switched through to the MGR.

When the network offers the call to the MGR at 112, it provides DN of the calling UD in the Origination Address field of the SETUP message as described in the CCITT I.451 sections 4.5.21 and 5.1.9. The communication lines assigned to the MGR must be subscribed for receiving the Origination Address field from the network. The MGR accepts the call at step 114 and extracts the DN associated with the calling UD from the SETUP message. The MGR also receives the UID of the calling UD from the SETUP message or from the message over B-channel as explained above.

Figure 5:
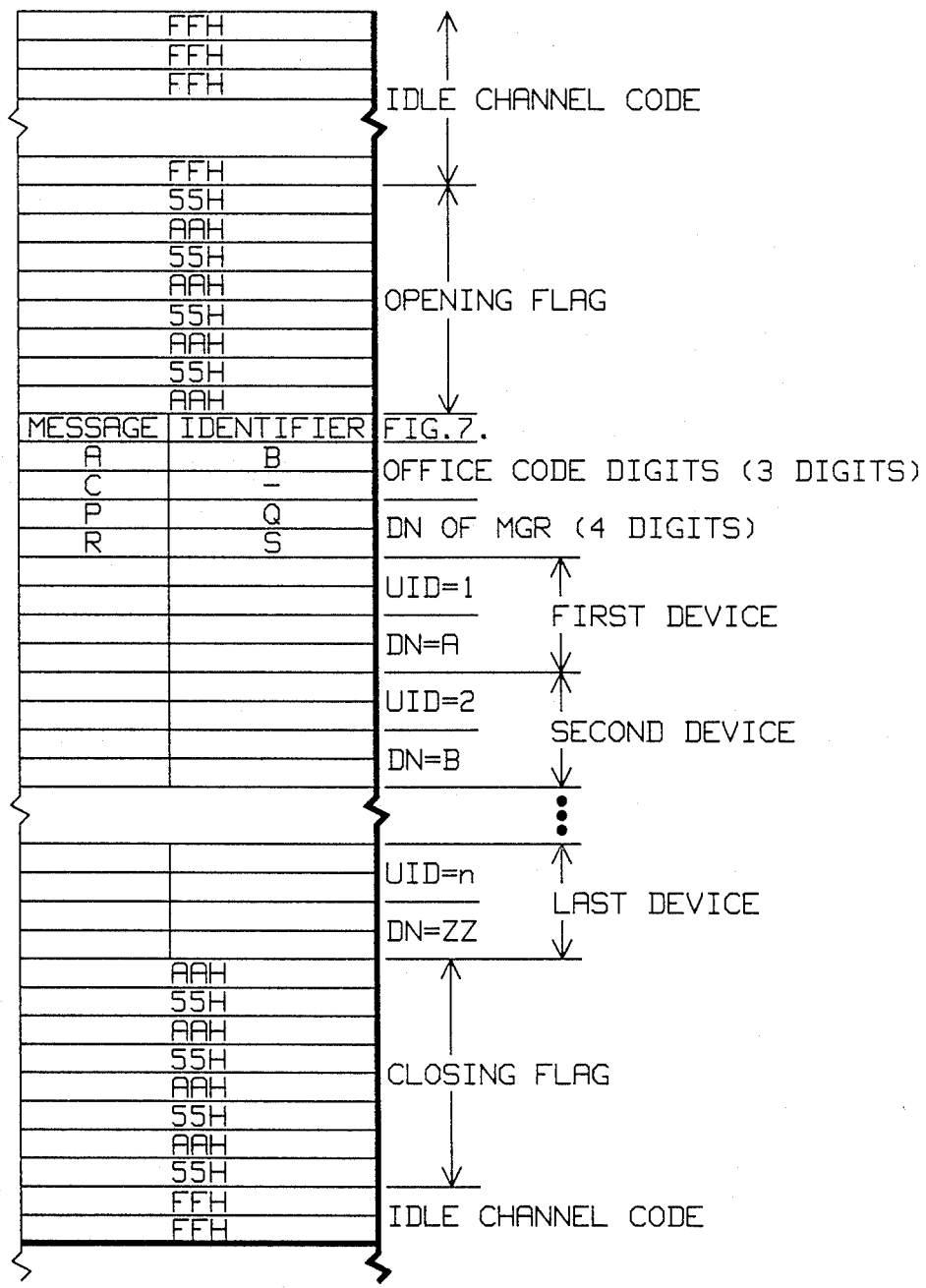
FIG. 5 shows an example format for a channel message for translation table update.

The MGR maintains in its data base a record of all Users and their directory numbers as shown in FIG. 5. This table represents the User Device Identity (UID) and the associated Directory Number (DN) and is referred to as the Translation Table. When UID and the associated DN is received as explained above, the MGR updates its table (FIG. 5) and sends a copy of the Table to the UD over the B-channel at step 116. A typical format of this B-channel message from MGR may be as shown in FIG. 6.

The B-channel message from MGR includes an opening flag to distinguish from the Idle channel code (all ones) on B-channel followed by the Message Identifier which indicates in this case that the message includes Table Update. A typical list of the Message Identifiers is given in FIG. 6. The message includes the office code (typically 3 digit) associated with the communication lines. It then details the UID codes and the rest of the directory numbers (usually 4 digits). The message ends with an ending flag followed by the Idle channel code for example, (all ones).

The UD receives this B-channel message from the MGR and stores this in its data base memory. It then sends the same message back to the MGR as an acknowledgment of the message at step 118. Upon receiving this reflected message from the UD, the MGR verifies the contents with its original message. If any errors are detected, the message is retransmitted to the UD. Upon satisfactory transmission of the message, the MGR initiates release of the call at step 120. As a result, the network causes UD to release the call. The UD now marks the equipment available to the end user at 122 and maintains a copy of the Translation Table in its data base for call processing. After releasing the call, the MGR waits for any other incoming calls from UDs, for T2 seconds at 124 (the value of T2 may be programmed to be in the typical range of 30 seconds to 3 minutes). This allows the MGR to receive all information before informing all users of the changes. If other calls are received at 124, control passes back to 112.

After T2 timeout, the MGR begins to inform all users of the translation Table changes. This may be done by calling up one user at a time at 126 and sending the Table Modify message over a B-channel at 128. The Manager retries at 130 until each UD has been reached and updated. The content of the Table Modify message will be a list of the UIDs and their new DNs. When the UD receives and acknowledges this message at 131, the MGR releases the call at 132 calls the next UD and repeats this until all users are informed at 134. If any broadcast facilities are available for the MGR, the process of informing such changes can be made very efficient as will be clear to those skilled in the art. The process terminates at step 136.

If an end user wishes to dial another user at the CPE, he dials the UID (usually 2 or 3 digit number) associated with the called party. The UD uses the Table in its data base and translates the UID dialed by the user into the DN associated with the aled party. The UD then initiates call setup using this DN in the same way as if the user dialed the DN of the called party. This is done transparent to the network which completes the call in a normal manner and the cell is offered to the called party. It should be noted that the calling user does not even need to know the DN of the called party in order to place a call within the CPE.

In using the UID codes for calling another user at the CPE, the user also benefits from the abbreviated dialing (2 or 3 digits instead of 7 digits) at no additional cost. If the user calls any outside number, the UD would not use this Table and would initiate call with the dialed digits. To distinguish between an outside number and the inside (within CPE) number, the dialing scheme may include a prefix "number" or "*" followed by either UID code for the internal calls or an outside directory number depending on the call distribution between the internal and outside calls. All incoming calls may be handled without the use of the Translation Table and are therefore processed in a normal manner.

Figure 7:
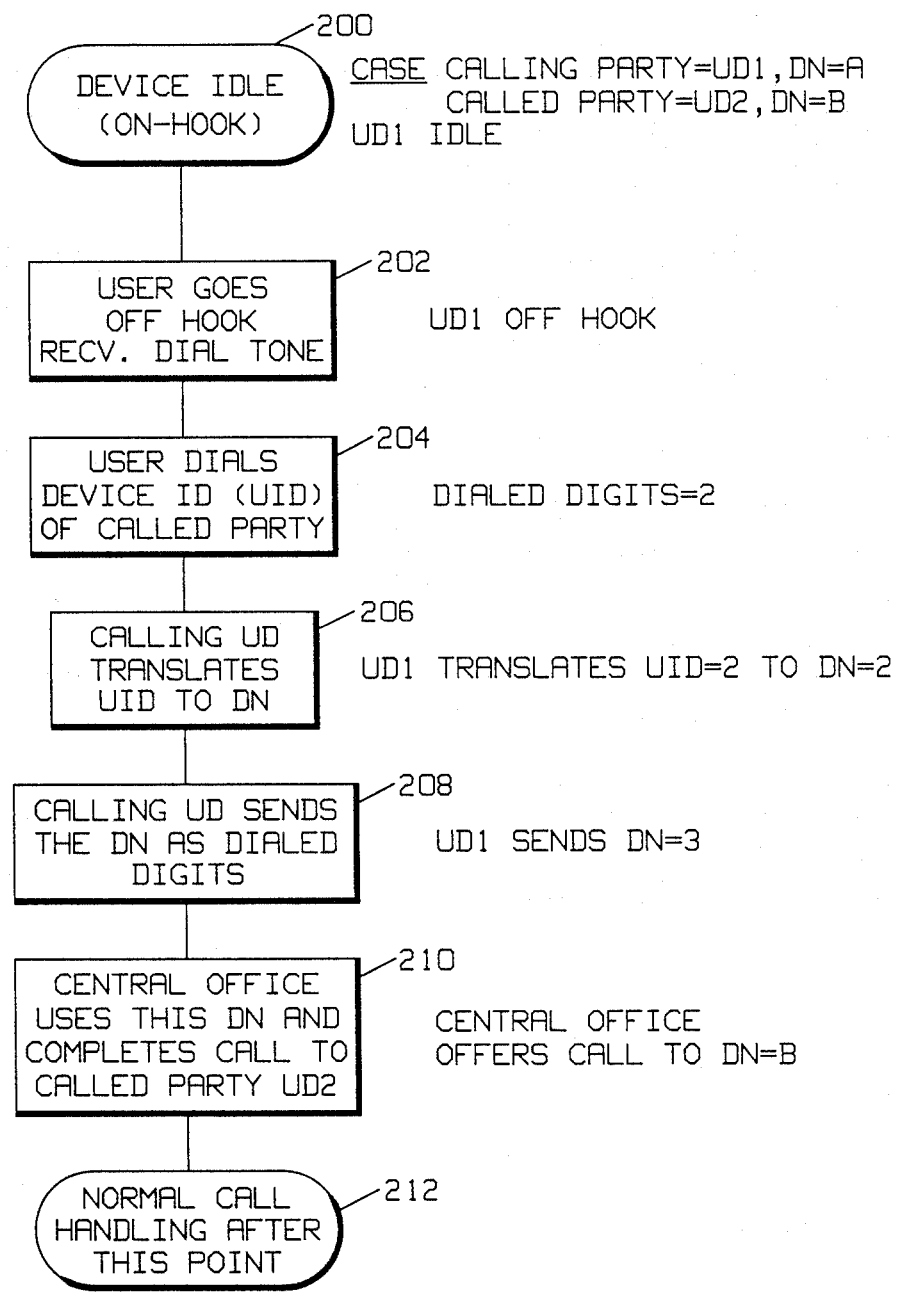
FIG. 7 is a flow chart of the call initiation sequence of the present invention.

The process of initiating a call is shown in detail in the flow chart of FIG. 7. The process starts at step 200 with the device idle. The user goes off hook at 202 and receives a dial tone. At 204 the user dials the device identification code of the called party. This device identification code is translated at 206 to the DN of the called party. This DN is actually dialed by the originating UD at 208. The central office uses this DN to complete the call to the called party at 210. Normal call handling occurs at this point at step 212.

When it is desired to make a move or change in the communication system it may be easily effected using the present invention. Such moves and changes occur frequently in many user environments. For example, when a person is promoted he or she frequently moves to a new office within the same customer premise but desires to maintain the same phone number to minimize problems with contacting that person. The case when a user originally on Directory number=A moves to a location within CPE with an access to Directory number=B would have his move taken care of as follows.

The user unplugs his or her UD at original location (DN=A), and plugs in the UD at the new location (DN=B). As soon as the equipment is plugged in and powered, the UD will go through an initialization process and then will generate an Auto Call as explained earlier, to notify the MGR of the new DN associated with the UID. The MGR records this change against the UID in the Translation Table and provides a fresh copy of the Table to the UD that just moved. The MGR also modifies the Translation Tables resident in each UD at the CPE. This makes it possible to terminate any new calls initiated at the CPE to the user originally on DN=A to his/her new location at DN=B.

This is achieved without a service request to the telephone company and without end users having to know the directory numbers of the co-workers at the CPE. One minor drawback of this approach is that since telephone company is not notified of the changes, the telephone directory will show the original DNs. The outside parties will have to be notified by other means. This may be handled in a variety of ways.

In addition to the management of moves and changes, the MGR may be used for several other service features, some of which are described below:

CLASS OF SERVICE:

The MGR may control the class of service for end users. A class of service determines the service access restrictions for the particular user. In PABXs, this is done by maintaining the class of service records for each user device, and the call processing software uses this information to allow or restrict users from using certain services.

when a UD is initialized, it will automatically report its identity and the Directory number provided by the network to the MGR as described earlier. The MGR will then provide a copy of the latest Translation Table. At this time, the MGR may also send the class of service information to the UD. The software in UD must utilize this information to make decisions on how to handle calls.

MESSAGE DETAIL RECORDING:

The purpose of this service is to collect the record of the calls made or attempted by each user during a specific time period. The feature provides centralized means of collecting these records from all UDs for a variety of reasons.

The UDs should be designed to keep a log of calls made or attempted in order to utilize this feature. The information may include: called number, duration of call, number of incoming calls, number of incomplete call attempts etc.

Periodically, for example once a day, the MGR requests for this information from all UDs. The information will be dumped by the addressed UD via a B-channel. As the MGR complete collecting data from a UD, the information is transferred to a printer or to a host system via the data port (RS232C or V.35) available on the MGR.

TOLL RESTRICTION:

The access to toll facilities may be controlled by the MGR. The UDs may be provided with an information from the MGR which will include whether the UD is restricted from toll access, and if not which area codes are permitted. The UD must be designed to process first few digits to make determination of whether the call is allowed. If the call is not allowed, the user is given some indication (tone) of this restriction.

TESTING:

The MGR may be used to perform some tests to ensure that the addressed UD is functional. A test pattern be may sent with the Test Message (FIG. 7) to a UD, and the UD may send the test pattern back to the MGR ensuring the functionality of the UD, for transmission capabilities. A similar test message may also cause the UD to dump all database stored in its memory to the MGR via B-channel.

Those skilled in the art will recognize that many variations of the present invention are possible. For example, the programmed general purpose processor of FIG. 2 may be replaced with a dedicated hardware based processor and the program memory eliminated. Also, other types of memory may prove useful in some embodiments. Those skilled in the art will also recognize other enhanced services which may be effected with the assistance of the manager.

Thus it is apparent that in accordance with the present invention an apparatus and method that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modification and variations as fall within the spirit and broad scope of the appended claims.

What is claimed is:

1. A communication system, comprising:
a plurality of N communication links coupled to a central office;
a plurality of N−1 user devices coupled to N−1 of said N communication links, each of said N−1 user devices including a memory means for storing a translation table relating a device identification code for each of said N−1 user devices to a directory code associated with each of said communication links;
input means, situated at each of said N−1 user devices, for allowing a user to supply a device identification code of another user device to be called;
translating means, situated at each of said N−1 user devices, for translating said device identification code to it's associated directory code responsive to said input means by reading said translation table;

call initiation means, responsive to said translating means, for initiating a call setup; and a manager means, coupled to the remaining one of said N communication links, for updating each of said memory means responsive to changes in the relationship between device identification codes and directory codes due to changes in the configuration of said communication system.

2. The apparatus of claim 1, wherein said N−1 user devices each include means for automatically transmitting a message to said manager means upon connection of said user device to one of said communication links, said message including the device identification code for said user device, so that changes in said translation table are automatically made as a result of changes in the configuration of said communication system.

3. The apparatus of claim 1, wherein said communication links include integrated services digital network communication links.

4. The apparatus of claim 3, wherein said translation table is stored in nonvolatile memory.

5. A method of providing for moves and changes in a communication system, comprising the steps of:

providing a plurality of user devices and a manager device for connection to a plurality of communication links, each of said communication links coupled to a central office;

connecting one of said user devices to one of said communication links;

transmitting a message from said one user device to said manager device through a central office to notify said manager device of a connection of said one user device to said communication link; and transmitting a message from said manager device to each of said user devices to update a translation table in each of said user devices, each said translation table serving to provide a translation between a device code associated with each user device to a directory code associated with each of said communication links, so that when said connecting step is carried out, the first and second transmitting steps update translation tables in all user devices and the manager device.

6. The method of claim 5, wherein said step of transmitting said message from said one user occurs automatically as a result of connection of said one user device to said one of said communication links.

7. The method of claim 5, wherein said transmitting steps include transmitting integrated services digital network packets.

8. A user device suitable for connection to a communication channel to a central office, comprising:

a transmission channel interfacing means for providing standard channel interfacing functions for the type of communication channel being used;

input means for allowing a user to supply a device identification code for another user to be contacted;

translation means, responsive to said input means, for translating said device identification code to a directory code;

call initiation means, responsive to receipt of said directory code from said translation means, for setting up a communication link over said communication channel; and updating means, responsive to messages received over said communication channel, for updating said translation means when changes in relationships between said device identification code and said directory code occur.

* * * * *